Aug. 7, 1923.
H. L. STAPLES
AUTOMOBILE SIGNAL
Filed Aug. 5, 1922   2 Sheets-Sheet 1
1,464,451
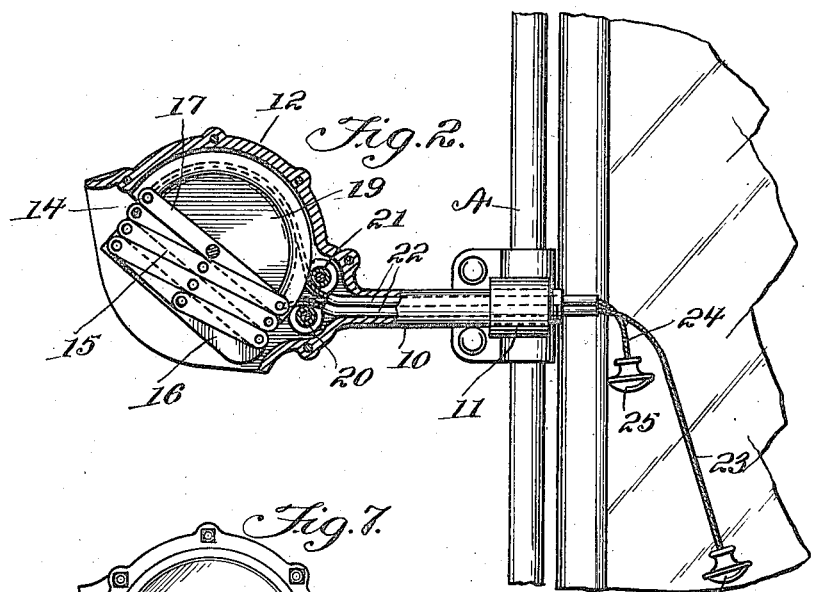
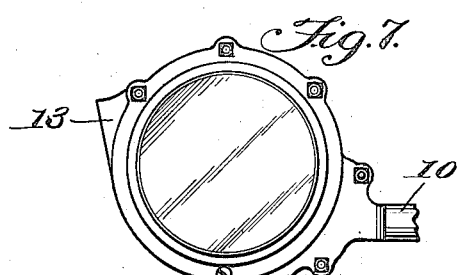
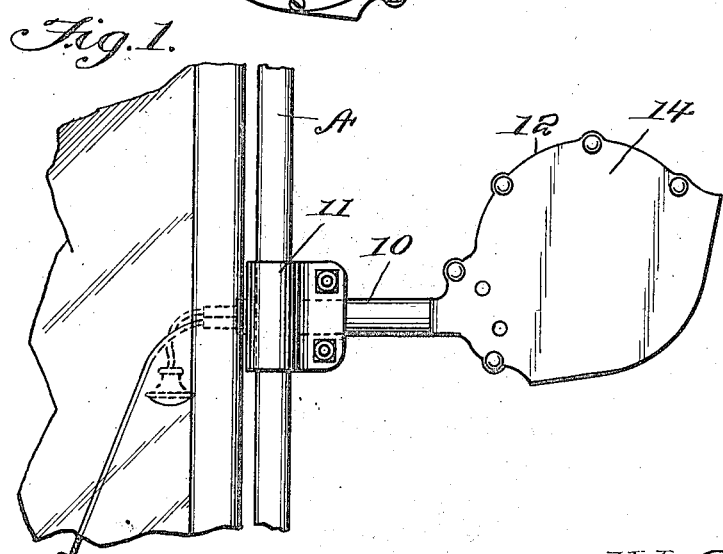
H. L. Staples
INVENTOR
BY Victor J. Evans
ATTORNEY
WITNESS: J. F. L. Wright

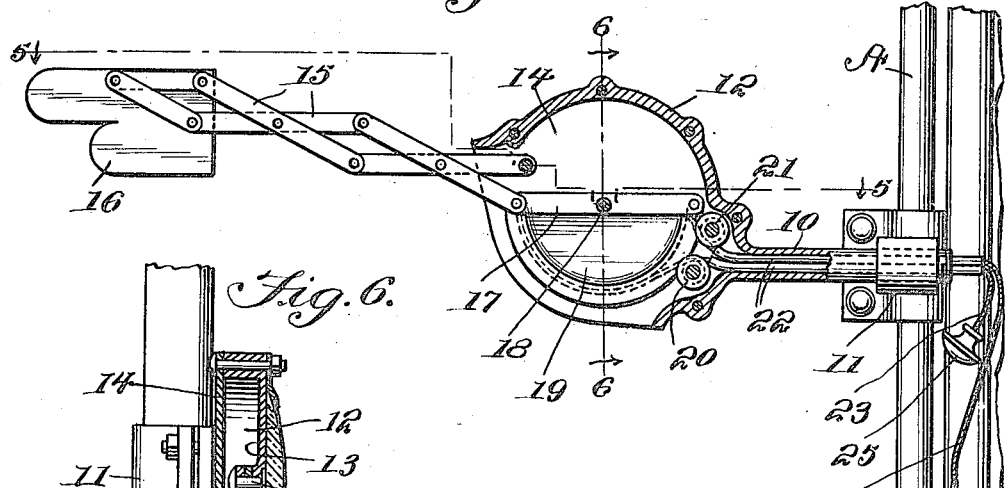
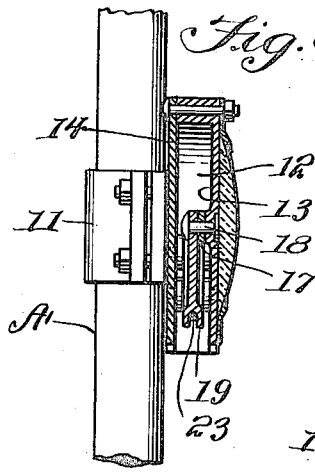
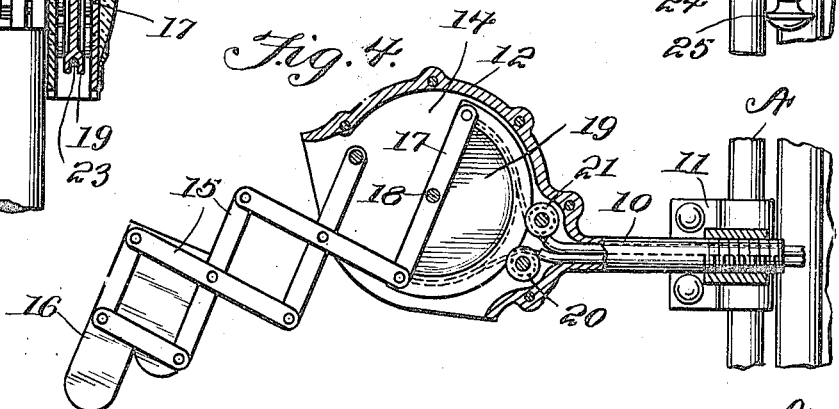
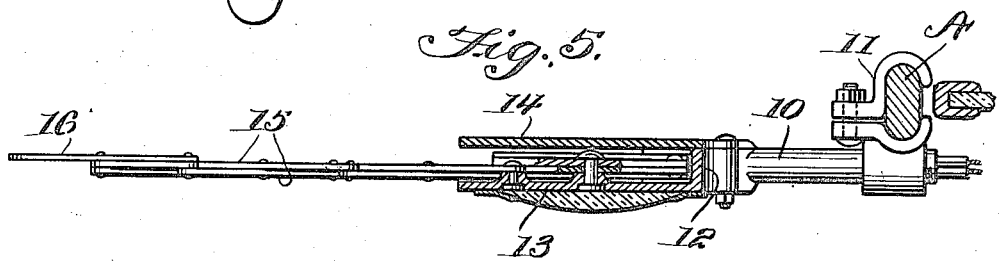

Patented Aug. 7, 1923.

1,464,451

UNITED STATES PATENT OFFICE.

HERSEY L. STAPLES, OF DULUTH, MINNESOTA.

AUTOMOBILE SIGNAL.

Application filed August 5, 1922. Serial No. 579,860.

*To all whom it may concern:*

Be it known that I, HERSEY L. STAPLES, a citizen of the United States, residing at Duluth, in the county of St. Louis and State of Minnesota, have invented new and useful Improvements in Automobile Signals, of which the following is a specification.

This invention relates to signaling devices, particularly to direction indicators for automobiles, and has for its object the provision of a novel device designed to be mounted upon the wind shield of an automobile and operable to indicate to the driver of approaching and following vehicles, and also pedestrians and traffic officers a contemplated turn to the left or a stop, the device being advantageous in reducing likelihood of collisions and traffic congestion and having the further advantage of rendering it unnecessary for the operator to stick out his hand to indicate a turn or stop.

An important object is the provision of a device of this character which is operated by a quick pull upon an operating cable, the device remaining in set position without further attention on the operator's part until the turn or stop has been made, thus allowing the operator to use both hands upon the steering wheel.

An additional object is the provision of a device of this character which will be simple and inexpensive in manufacture, which will be easily applied without special tools, which will be pleasing in appearance and which will be a general improvement in the art.

With the above and other objects and advantages in view the invention consists in the details of construction to be hereinafter more fully described and claimed and illustrated in the accompanying drawings, in which:

Figure 1 is a front elevation of my device in applied position upon the wind shield of an automobile and showing the parts in inoperative position, Figure 2 is a similar view looking toward the wind shield from the inside of the vehicle showing the casing in section and the parts in inoperative positon, Figure 3 is a view similar to Figure 2 showing the device in extended position, Figure 4 is a similar view showing the device in the stop indicating position that is in the intermediate position, Figure 5 is a plan view with the casing in section, Figure 6 is a vertical section on the line 6—6 of Figure 3, and Figure 7 is a detail view of the casing looking at the side toward the driver.

Referring more particularly to the drawings the letter A designates a portion of the windshield of a vehicle upon which I mount my device. In carrying out my invention I provide a tubular support 10 held upon the windshield by any suitable clamps 11 though it should be distinctly understood that if preferred the device might be mounted upon the body, or in case of a sedan or limousine at an edge of a window. The free end of this tubular support has spaced arms 12 formed preferably integrally thereon though they might of course be suitably secured thereto and the arms are here shown as having their outer ends connected as shown at 13. It is preferable to provide a casing 14 which is suitably secured upon the arms 12 for the purpose of enclosing and protecting from the weather the signal mechanism to be described. This casing may be enameled, painted or otherwise treated to present a pleasing appearance. Obviously one edge of the case must open.

The signal proper consists of a lazy tongs 15 which has its one endmost link carrying a signal element 16 here shown as the representation, is roughly, of a human hand which may be painted either white or red so as to be conspicuous, red being however preferable. The other endmost link 17 of the lazy tongs structure is pivoted intermediate its ends, as shown at 18, against the inner side of one of the arms 12 and carried by this link 17 is a grooved half wheel 19. Journaled between the arms 12 adjacent the periphery of this half wheel are rollers 20 and 21. Extending longitudinally through the support 10 are guide tubes 22 which terminate adjacent the rollers 20 and 21.

The operating means consists of two flexible cables or wires 23 and 24 which are provided at one end with knobs or handles 25. The cable or wire 23 extends under the roller 20, lies within the grooved periphery of the half wheel and is secured to this half wheel at one end thereof while the cable 24 is trained over the roller 21, lies within the groove of the half wheel and is connected with the other end thereof.

The normal position of the parts is shown in Figures 1 and 2 and it will be noted that the wire 24 projects farther beyond the end of the tubular support than the wire 23 so that the position of the knobs will be as shown and will indicate to the operator which one he should pull to give the desired signal. When it is desired to signal an intention to stop, the operator pulls upon the wire 23 so that the half wheel 19 will be turned approximately half way which will result in partial projection of the lazy tongs so that the signal hand 16 carried thereby will point downwardly. To indicate an intended turn to the left the operator pulls the cable 23 as far as it will go which will result in swinging the half wheel a half turn which will result in complete projection of the lazy tongs with the signal hand 16 pointed straight out.

When the turn or stop is completed the parts are returned to normal position by pulling upon the cable 24 which will return the lazy tongs into retracted position entirely enclosed within the casing 14 so that the parts will be protected from rain and dust.

From the foregoing description and a study of the drawings it will be apparent that I have thus provided a simply constructed and consequently inexpensive signal device which is easily applied without in any way altering the construction of the wind shield or other part of the vehicle, which is operable by a slight pull and which will consequently be a great convenience and safe guard in traffic.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A signal device of the character described comprising a tubular support provided with clamping means for effecting mounting and carrying a casing having its outer edge and a portion of its bottom open, a grooved half disk journaled within the casing, lazy tongs having one end most link secured upon said half disk and one end of the next adjacent link pivoted within the casing, a signal member mounted on the other end of the lazy tongs, and means for partially rotating said half disk whereby to effect projection and simultaneous upward swinging movement of the lazy tongs.

2. A signal device of the character described comprising a tubular support provided with clamping means for effecting mounting and carrying a casing having its outer edge and a portion of its bottom open, a grooved half disk journaled within the casing, lazy tongs having one end most link secured upon said half disk and one end of the next adjacent link pivoted within the casing, a signal member mounted on the other end of the lazy tongs, and means for partially rotating said half disk whereby to effect projection and simultaneous upward swinging movement of the lazy tongs, said means consisting of flexible members connected with the ends of the half disk, extending through and beyond the tubular support and carrying handles.

3. A signal device of the character described comprising a tubular support provided with clamping means for effecting mounting and carrying a casing having its outer edge and a portion of its bottom open, a grooved half disk journaled within the casing, lazy tongs having one end most link secured upon said half disk and one end of the next adjacent link pivoted within the casing, a signal member mounted on the other end of the lazy tongs, and means for partially rotating said half disk whereby to effect projection and simultaneous upward swinging movement of the lazy tongs, said means consisting of guide rollers within the casing at its juncture with the tubular support, and flexible members trained against said rollers with their end portions lying within the groove of the half disk and their terminals secured to the ends of the diameter of the half disk.

In testimony whereof I affix my signature.

HERSEY L. STAPLES.